(12) United States Patent
Grupido et al.

(10) Patent No.: US 8,316,731 B2
(45) Date of Patent: Nov. 27, 2012

(54) POWER TRANSMISSION DEVICE WITH TORQUE-RESISTANT SEAL

(75) Inventors: Salvatore N Grupido, Rochester, MI (US); Eric A Rivett, Troy, MI (US); James P Borowiak, Grand Blanc, MI (US); Shemek Swieczkowski, Macomb Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 1058 days.

(21) Appl. No.: 12/249,111

(22) Filed: Oct. 10, 2008

(65) Prior Publication Data
US 2010/0090418 A1    Apr. 15, 2010

(51) Int. Cl.
*F16H 1/14* (2006.01)
(52) U.S. Cl. .......... 74/417; 74/606 R; 277/616; 285/345
(58) Field of Classification Search ............... 74/416, 74/417, 423, 424, 606 R; 277/607, 612, 277/614, 615, 616, 625; 285/345, 379
See application file for complete search history.

(56) References Cited

U.S. PATENT DOCUMENTS

| | | | | |
|---|---|---|---|---|
| 2,230,725 | A | * | 2/1941 | Nathan ........................ 277/624 |
| 2,396,491 | A | * | 3/1946 | Chamberlain ................ 277/615 |
| 4,579,353 | A | * | 4/1986 | Bower ......................... 277/615 |
| 6,280,335 | B1 | | 8/2001 | Wehner et al. |
| 6,336,868 | B1 | | 1/2002 | Kurecka et al. |
| 6,354,602 | B1 | | 3/2002 | Oldenburg |
| 6,357,757 | B1 | | 3/2002 | Hibbler et al. |
| 6,814,668 | B2 | | 11/2004 | Grupido |
| 6,827,649 | B2 | | 12/2004 | Menosky et al. |
| 6,837,795 | B2 | | 1/2005 | Menosky et al. |
| 6,855,059 | B2 | | 2/2005 | Menosky et al. |
| 6,893,350 | B2 | | 5/2005 | Menosky et al. |
| 6,994,627 | B2 | | 2/2006 | Menosky et al. |
| 7,004,879 | B2 | | 2/2006 | Beutler |
| 7,025,679 | B2 | | 4/2006 | Menosky et al. |
| 7,044,859 | B2 | | 5/2006 | Menosky et al. |
| 7,086,952 | B2 | | 8/2006 | Wehner |
| 7,189,162 | B2 | | 3/2007 | Menosky et al. |
| 7,201,663 | B2 | | 4/2007 | Menosky |
| 7,241,243 | B2 | | 7/2007 | Duncan |
| 7,374,508 | B2 | | 5/2008 | Duncan |

* cited by examiner

*Primary Examiner* — William C Joyce
(74) *Attorney, Agent, or Firm* — Harness, Dickey & Pierce, P.L.C.

(57) ABSTRACT

A power transfer unit that includes a structure, a tube and a seal. The structure defines a boss that projects along an axis. The boss has a first portion, which defines a gripping surface, and a second portion that defines a sealing surface. The tube has an end that is disposed concentrically about at least a portion of the boss. The seal is received between and sealingly engaged against the structure and the tube. The seal includes a seal body with a seal member and a coupling portion. The seal member sealingly engages the sealing surface and the coupling portion frictionally engages the gripping surface.

17 Claims, 3 Drawing Sheets

POWER TRANSMISSION DEVICE WITH TORQUE-RESISTANT SEAL

FIELD OF THE INVENTION

The present invention generally relates to a power transmission device with a torque-resistant seal.

With reference to FIG. 1, a portion of a power transfer unit 200 is illustrated to include a housing 202, a cover 204, a static shaft 206, an input gear 208, a pair of bearings 210, an intermediate gear 212 and an output pinion 214. The housing 202 can include a wall member 220 that can define a cavity 222 in which the static shaft 206, the input gear 208, the intermediate gear 212, the output pinion 214 and a lubricant 224 can be received. The wall member 220 can further define a boss 226 having a generally cylindrical outer surface 228 that can extend into the cavity 222. The cover 204 can be coupled to an end of the housing 202 and can close an end of the cavity 222 opposite the boss 226. The static shaft 206 can be a hollow, tubular structure that can extend between the boss 226 and the cover 204. The bearings 210 can be coupled to the housing 202 and the cover 204 and can support the input gear 208 for rotation in the housing 202. The intermediate gear 212 can be rotatably coupled to the input gear 208 and meshingly engaged with the output pinion 214. An annular space 230 can be disposed between the static shaft 206 and the input gear 208 to accommodate the lubricant 224. Seals 232 and 234 of various types are employed to prevent the lubricant 224 from entering a hollow interior 238 of the static shaft 206. For example, a first one of the seals 232 can comprise an O-ring that is disposed in an annular groove 240 formed about the boss 226, while the other one of the seals 234 can comprise an O-ring that is disposed between the inner diameter of an aperture 246 in the cover 204 and the inner cylindrical surface 248 of the static shaft 206.

During operation of the power transfer unit 200, rotary power is transmitted from the input gear 208, through the intermediate gear 212 and into the output pinion 214. A shear force generated in the lubricant 224 during rotation of the input gear 208 can be transmitted to the static shaft 206. In some situations, the shear force transmitted through the lubricant 224 can cause the application of a sufficient amount of torque to the static shaft 206 to cause the static shaft 206 to rotate and possibly leak.

SUMMARY OF THE INVENTION

This section provides a general summary of some aspects of the present disclosure and is not a comprehensive listing or detailing of either the full scope of the disclosure or all of the features described therein.

In one form, the present disclosure provides a power transfer unit that includes a structure, a tube and a seal. The structure defines a boss that projects along an axis. The boss has a first portion, which defines a gripping surface, and a second portion that defines a sealing surface. The tube has an end that is disposed concentrically about at least a portion of the boss. The seal is received between and sealingly engaged against the structure and the tube. The seal includes a seal body with a seal member and a coupling portion. The seal member sealingly engages the sealing surface and the coupling portion frictionally engages the gripping surface.

In another form, the present disclosure provides a method for forming a power transfer unit. The method includes: providing a tube; installing a seal to the tube, the seal including a seal lip and a coupling portion; installing the tube over a boss on a structure, the seal lip being sealingly engaged to a sealing surface formed on the boss and the coupling portion being sealingly engaged to a gripping surface formed on the boss; and mounting a gear to the structure such that the gear is concentrically disposed about the boss.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE PREFERRED EMBODIMENTS

Figure 1:
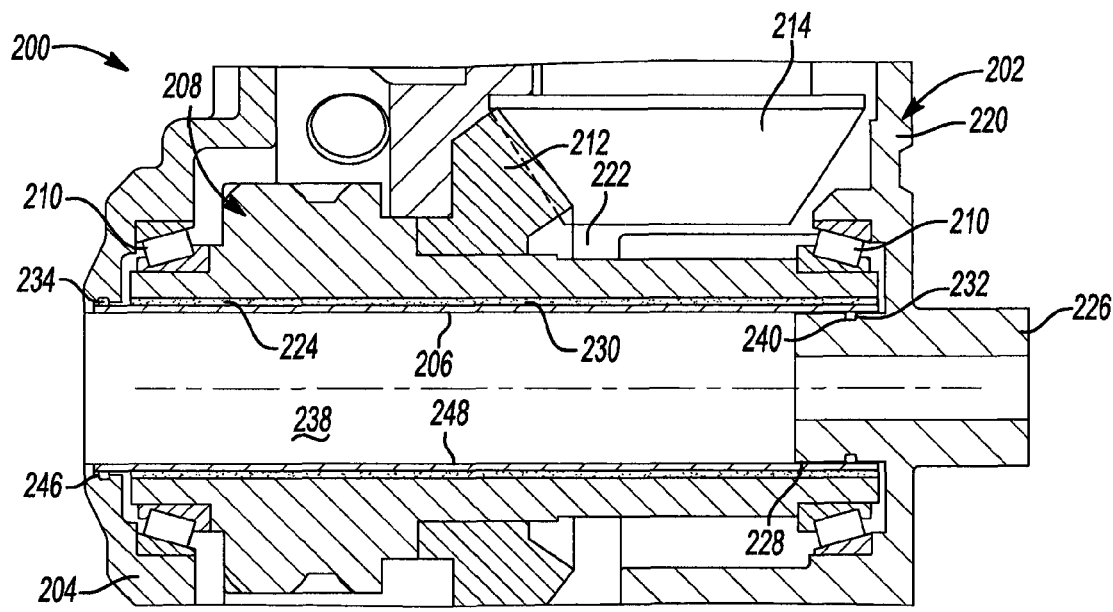
FIG. 1 is a sectional view of a portion of a prior art power transfer unit.
Figure 2:
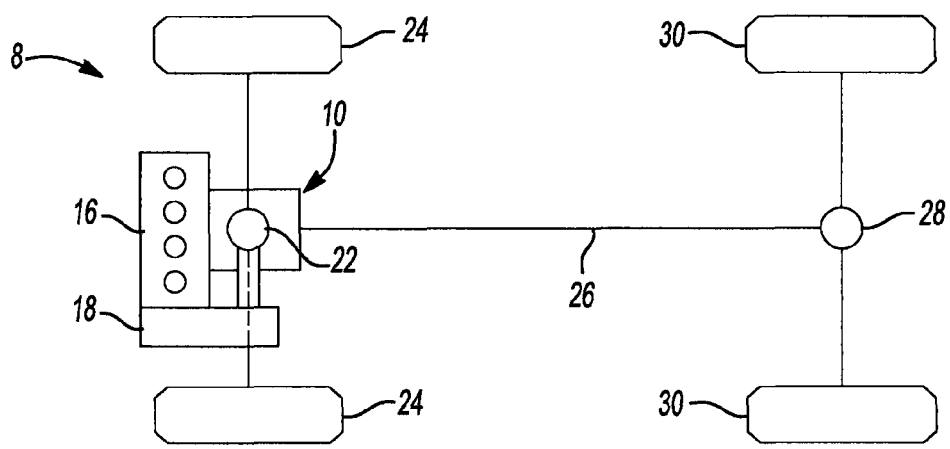
FIG. 2 is a schematic illustration of a vehicle having a power transfer unit constructed in accordance with the teachings of the present disclosure.

With reference to FIG. 2, a vehicle 8 having a power transfer unit 10 constructed in accordance with the teachings of the present disclosure is schematically illustrated. The vehicle 8 can include a source of rotary power, such as an engine 16, a transmission 18 and the power transfer unit 10. Rotary power output from the engine 16 is received by the transmission 18 and transmitted to a front differential 22 and the power transfer unit 10. The rotary power transmitted to the front differential 22 is transmitted to a pair of front vehicle wheels 24, while the rotary power transmitted to the power transfer unit 10 is transmitted (via a propshaft 26) to a rear differential 28 where the rotary power is transmitted to a pair of rear vehicle wheels 30.

Figure 3:
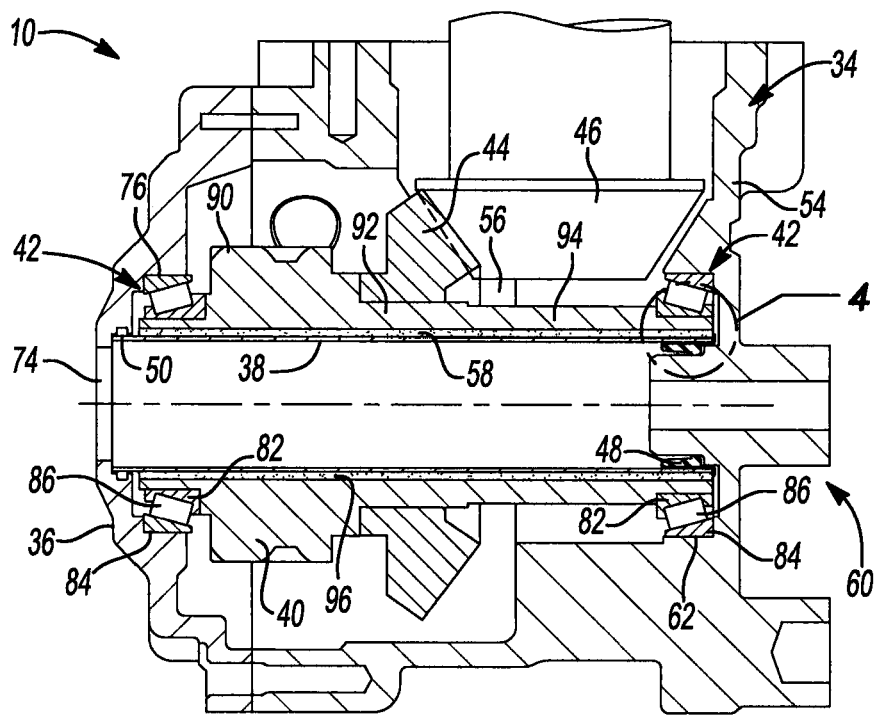
FIG. 3 is a sectional view of a portion of the power transfer unit of FIG. 2.
Figure 4:
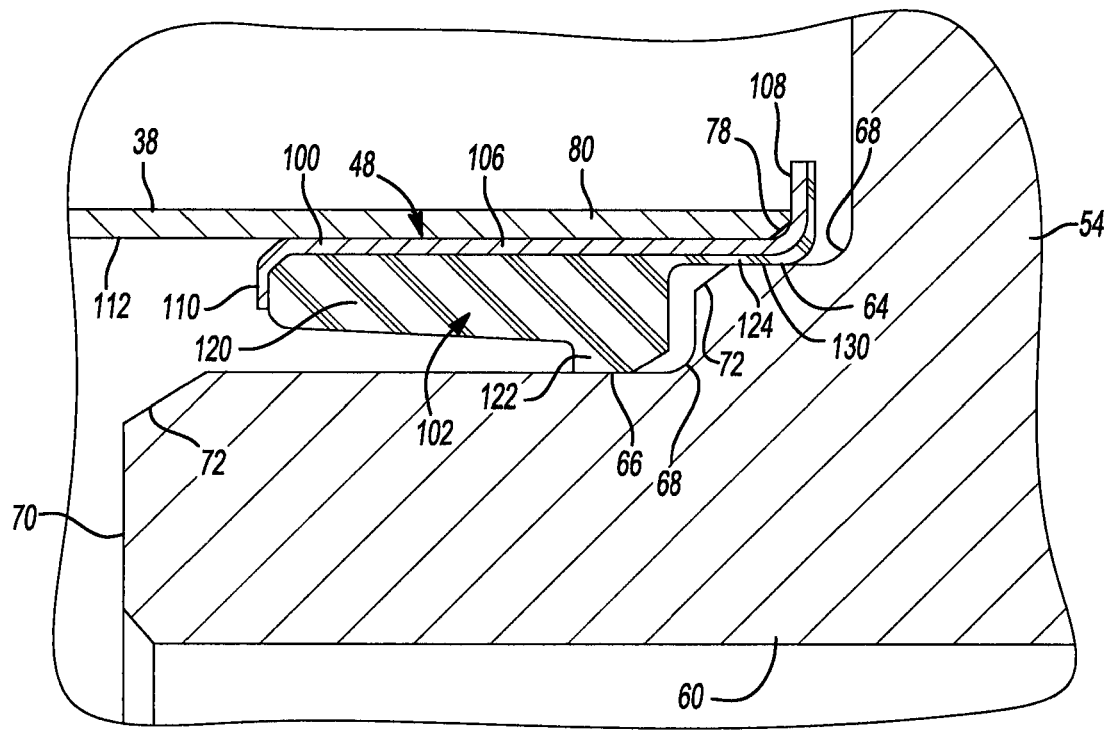
FIG. 4 is an enlarged portion of FIG. 3.
Figure 5:
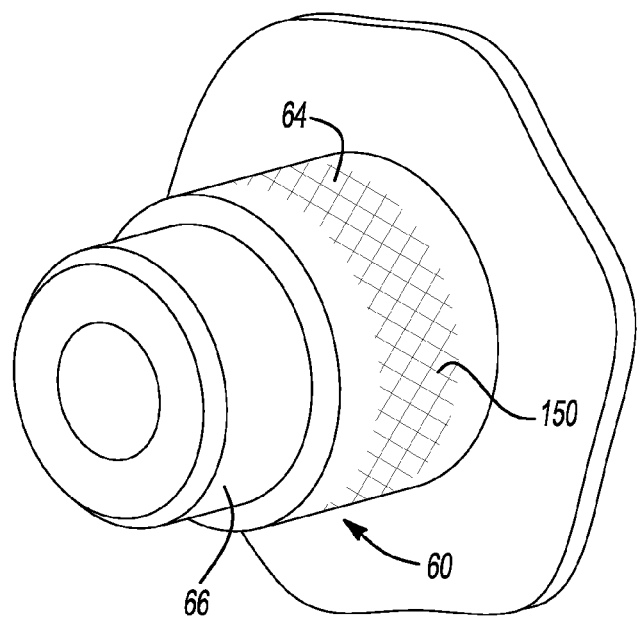
FIG. 5 is a perspective view of a portion of another power transfer unit constructed in accordance with the teachings of the present disclosure.

With reference to FIGS. 3 and 4, the power transfer unit 10 is partially illustrated as including a housing 34, a cover 36, a static tube 38, an input gear 40, a pair of bearings 42, an intermediate gear 44, an output pinion 46 and first and second seals 48 and 50, respectively.

The housing 34 can include a wall member 54 that can define a cavity 56 in which the static tube 38, the input gear 40, the intermediate gear 44, the output pinion 46 and a lubricant 58 can be received. The wall member 54 can further define a hollow boss 60, which can extend into the cavity 56, and a first bearing seat 62 that can be disposed concentrically about the boss 60. The boss 60 can include a gripping surface or first surface 64 and a sealing surface or second surface 66. The first and second surfaces 64 and 66 can be generally cylindrically shaped and the second surface 66 can be smaller in diameter than the first surface 64. The inside corner between the wall member 54 and the first surface 64 and inside corner between the first and second cylindrical surfaces 64 and 66 can be broken by a fillet radius 68 (as shown) or an undercut (not shown). The outside corner between the first and second cylindrical surfaces 64 and 66 and the outside corner between the second surface 66 and an axial end face 70 of the boss 60 can be broken by a radius (not shown) or a chamfer 72.

The cover 36, which can be conventional in its construction, can be coupled to an end of the housing 34 and can close an end of the cavity 56 opposite the boss 60. The cover 36 can include an aperture 74 and a second bearing seat 76 that can be disposed concentrically about the aperture 74.

The static tube 38 can be a hollow, tubular structure that can extend between the boss 60 and the cover 36. The length of the static tube 38 can be selected to axially overlap the first surface 64 of the boss 60. A chamfer 78 can be formed on the inside diameter of an end 80 of the static tube 38 proximate the wall member 54.

The bearings 42 can be coupled to the housing 34 and the cover 36 and can support the input gear 40 for rotation in the housing 34. The bearings 42 can include an inner race 82, which can be press-fit to the input gear 40, an outer race 84 and a plurality of bearing elements (e.g., rollers 86) that are disposed between the inner and outer races 82 and 84. The outer races 84 can be received in the first and second bearing seats 62 and 76 and press-fit to the housing 34 and the cover 36, respectively.

The intermediate gear 44 can include a gear portion 90, a gear mount 92 and a hollow shaft portion 94. The gear portion 90 can be adapted to meshingly engage another gear (not shown) in the power transfer unit 10 to receive rotary power therefrom. The hollow shaft portion 94 can be press-fit to the inner races 82 of the bearings 42 and can extend coaxially about the boss 60. The intermediate gear 44, which is illustrated to be a bevel ring gear, can be fixedly coupled to the gear mount 92 and meshingly engaged with the output pinion 46, which can be rotatably mounted on bearings (not shown) that are mounted to the housing 34. In the particular example provided, the output pinion 46 is a bevel pinion. An annular space 96 can be disposed between the static tube 38 and the input gear 40 to accommodate the lubricant 58.

With specific reference to FIG. 4, the first seal 48 can include a case 100 and a seal body 102. The case 100 can be formed of a sheet metal material and can be generally Z or S shaped so as to include an annular body 106, a first flange 108 and a second flange 110. The annular body 106 is sized to be fixedly coupled to the inside surface 112 of the static tube 38. In the particular example provided, the annular body 106 is sized to be press-fit to the inside surface 112 of the static tube 38, but it will be appreciated that other coupling means, including adhesives, can be employed to fixedly couple the case 100 to the static tube 38. The first flange 108 can be coupled to a first end of the annular body 106 and can extend radially outwardly therefrom. The second flange 110 can be coupled to a second, opposite end of the annular body 106 and can extend radially inwardly therefrom. The seal body 102 can be formed of a suitable material, such as an elastomer, and can be fixedly coupled (e.g., bonded) to the case 100. The seal body 102 can include a body portion 120, a seal member 122 and a coupling portion 124. In the particular example provided, the body portion 120 extends over a majority of the annular body 106 and abuts the second flange 110. The seal member 122 can be coupled to or integrally formed with the body portion 120 and can sealingly engage the second surface 66 of the boss 60. In the particular example provided, the seal member 122 is an annular lip. The coupling portion 124 can extend from the body portion 120 on a side opposite the second flange 110. The coupling portion 124 can define an annular gripping surface 130 that can frictionally engage the first surface 64 of the boss 60. The coupling portion 124 can extend from the body portion 120 in a direction generally parallel to a longitudinal axis of the boss 60. The coupling portion 124 can extend coaxially with the annular body 106 and can be disposed onto or over the first flange 108. It will be appreciated that the chamfer 72 on the corner between the first and second surfaces 64 and 66 can aid installation of the coupling portion 124 onto the first surface 64 when the static tube 38 is installed to the housing 34. It will also be appreciated that the chamfer 72 on the corner between the second surface 66 and the axial end face 70 of the boss 60 can aid installation of the seal member 122 onto the second surface 66. It will be further appreciated that the first flange 108 can be employed as a "stop," which can be employed to position the seal member 122 relative to the static tube 38 in a desired location, and/or as a flange against which tooling can be abutted when the first seal 48 is installed to the static tube 38.

Returning to FIGS. 3 and 4, the second seal 50 can be disposed in the aperture 74 and can sealingly engage the cover 36 and the static tube 38 in a conventional manner. Accordingly, the second seal 50 will not be discussed in detail herein.

During operation of the power transfer unit 10, rotary power is transmitted from the input gear 40, through the intermediate gear 44 and into the output pinion 46. A shear force generated in the lubricant 58 during rotation of the input gear 40 can be transmitted to the static tube 38. The shear force transmitted through the lubricant 58 can apply a torque to the static tube 38 which can be resisted by the friction that is generated through contact between the seal member 122 and the second surface 66, as well as between the annular gripping surface 130 and the first surface 64.

It will be appreciated that the coupling portion 124 of the seal body 102 may, but need not, sealingly engage the first surface 64 of the boss 60. To further increase the friction between the annular gripping surface 130 and the first surface 64, it will be appreciated that one or both of the annular gripping surface 130 and the first surface 64 can be modified. For example, knurls 150 could be formed onto the first surface 64 or the first cylindrical surface could be formed in a non-cylindrical manner (e.g., with teeth or splines, or with a square or hexogonal shape).

Figure 6:
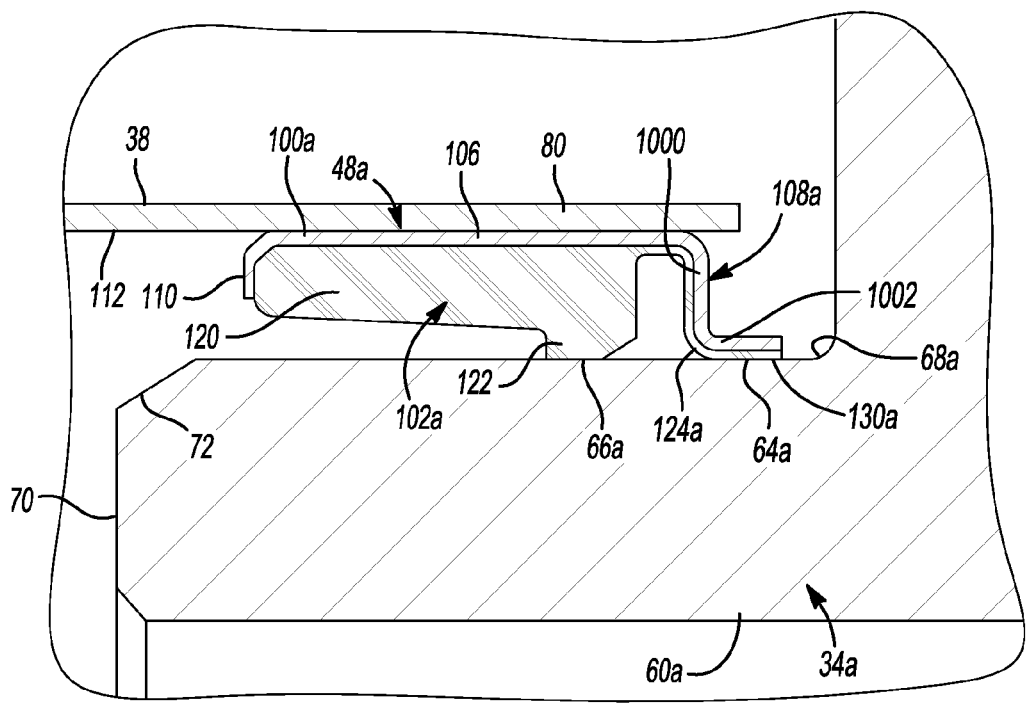
FIG. 6 is a view similar to that of FIG. 4 but illustrating a portion of yet another power transfer unit constructed in accordance with the teachings of the present disclosure.

A portion of another power transfer unit 10a constructed in accordance with the teachings of the present disclosure is illustrated in FIG. 6. The power transfer unit 10a can be generally similar to the power transfer unit 10 (FIG. 2) described in detail above, except that the first surface 64a on the boss 60a can be equal in diameter to the diameter of the second surface 66a to thereby simplify the geometry of the housing 34a. In this example, the case 100a can be formed of a sheet metal material and can be generally Z or S shaped so as to include an annular body 106, a first flange 108a and a second flange 110. The annular body 106 can be sized to be fixedly coupled to the inside surface 112 of the static tube 38. In the particular example provided, the annular body 106 is sized to be press-fit to the inside surface 112 of the static tube 38, but it will be appreciated that other coupling means, including adhesives, can be employed to fixedly couple the case 100a to the static tube 38. The first flange 108a can be coupled to a first end of the annular body 106 and can include a radially inwardly extending portion 1000 and an axially extending portion 1002. The second flange 110 can be coupled to a second, opposite end of the annular body 106 and can extend radially inwardly therefrom. The seal body 102a can be formed of a suitable material, such as an elastomer, and can be fixedly coupled (e.g., bonded) to the case 100*a*. The seal body 102*a* can include a body portion 120, a seal member 122 and a coupling portion 124*a*. In the particular example provided, the body portion 120 extends over a majority of the annular body 106 and abuts the second flange 110. The seal member 122 can be coupled to or integrally formed with the body portion 120 and can sealingly engage the second surface 66*a* of the boss 60*a*. In the particular example provided, the seal member 122 is an annular lip. The coupling portion 124*a* can extend from the body portion 120 on a side opposite the second flange 110 and can be coupled to the axially extending portion 1002. The coupling portion 124*a* can define an annular gripping surface 130*a* that can frictionally engage the first surface 64*a* of the boss 60. The coupling portion 124*a* can extend from the body portion 120 in a direction generally parallel to a longitudinal axis of the boss 60*a*. The coupling portion 124*a* can extend coaxially with the annular body 106 and can be disposed onto or over the first flange 108*a*. It will be appreciated that the chamfer 72 on the corner between the second surface 66*a* and the axial end face 70 of the boss 60*a* can aid installation of the coupling portion 124*a* onto the first surface 64*a* and the seal member 122 onto the second surface 66*a*.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A power transfer unit comprising:
   a structure defining a boss projecting along an axis, the boss having a first portion and a second portion, the first portion defining a gripping surface and the second portion defining a sealing surface;
   a tube having an end that is disposed concentrically about at least a portion of the boss; a gear disposed concentrically about the tube; and
   a seal received between and sealingly engaged against the structure and the tube, the seal including a seal body with a seal member and a coupling portion, the seal member sealingly engaging the sealing surface and the coupling portion frictionally engaging the gripping surface,
   wherein a perimeter of one of the gripping surface and the sealing surface is larger than a perimeter of the other one of the gripping surface and the sealing surface.

2. The power transfer unit of claim 1, wherein the sealing surface is cylindrical in shape.

3. The power transfer unit of claim 1, wherein the gripping surface is cylindrical in shape.

4. The power transfer unit of claim 1, wherein the gear includes a hollow shaft portion and a gear portion and wherein the hollow shaft portion surrounds the tube.

5. The power transfer unit of claim 1, wherein an annular space is disposed between the gear and the tube and a lubricant is disposed in the space.

6. The power transfer unit of claim 1, wherein the seal member is an annular lip.

7. The power transfer unit of claim 6, wherein the coupling portion has an annular shape that is disposed generally perpendicular to the annular lip.

8. The power transfer unit of claim 1, wherein the coupling portion has an annular shape.

9. The power transfer unit of claim 1, wherein the seal further comprises a case that is coupled to the seal body, the case being formed of metal.

10. The power transfer unit of claim 9, wherein the case includes a radially extending first flange that is coupled to the annular body.

11. The power transfer unit of claim 10, wherein the first flange extends radially outwardly from the annular body.

12. The power transfer unit of claim 11, wherein a second flange is coupled to the annular body on a side opposite the first flange, the second flange extending radially inwardly from the annular body.

13. The power transfer unit of claim 1, wherein the gripping surface includes a surface texture having at least one of knurls, grooves, ridges, splines and teeth.

14. The power transfer unit of claim 1, wherein the perimeter of the gripping surface is larger than the perimeter of the sealing surface.

15. A power transfer unit comprising:
   a structure defining a boss projecting along an axis, the boss having a first portion and a second portion, the first portion defining a gripping surface and the second portion defining a sealing surface;
   a tube having an end that is disposed concentrically about at least a portion of the boss;
   a gear disposed concentrically about the tube; and
   a seal received between and sealingly engaged against the structure and the tube, the seal including a seal body and a case, the seal body having a seal member and a coupling portion, the seal member sealingly engaging the sealing surface and the coupling portion frictionally engaging the gripping surface, the case being formed of metal and being coupled to the seal body;
   wherein the sealing surface and the gripping surface are cylindrical in shape;
   wherein an annular space is disposed between the gear and the tube and a lubricant is disposed in the space;
   wherein the seal member is an annular lip and the coupling portion has an annular shape that is disposed generally perpendicular to the annular lip.
   wherein the case includes a first flange and a second flange, the first flange being coupled to the annular body and extending radially outwardly therefrom, the second flange being coupled to the annular body on a side opposite the first flange and extending radially inwardly from the annular body; and
   wherein a perimeter of one of the gripping surface and the sealing surface is larger than a perimeter of the other one of the gripping surface and the sealing surface.

16. A power transfer unit comprising:
   a housing defining an internal cavity and having a boss extending into said cavity and projecting along an axis, said boss having first and second boss surfaces with the perimeter of said first boss surface being larger than the perimeter of said second boss surface;

a tube disposed in said internal cavity and projecting along said axis, said tube having an end portion that extends over said second boss surface and a part of said first boss surface;

a gear surrounding said tube and supported for rotation relative to said housing; and a seal assembly disposed between said boss and said end portion of said tube, said seal assembly including a rigid case and a resilient seal, said case including an annular body having an outer surface fixedly coupled to an inner surface of said tube, a first flange and a second flange, said first flange extends radially outwardly from a first end of said annular body and surrounds a portion of said first boss surface, said second flange extends radially inwardly from a second end of said annular body and surrounds a portion of said second boss surface, said resilient seal includes a body portion, a seal portion and a coupling portion, said body portion is coupled to an inner surface of said annular body and abuts said second flange, said seal portion extends radially inwardly from said body portion and sealingly engages said second boss surface, and said coupling portion extends from said body portion and is coupled to said inner surface of said annular body and said first flange, said coupling portion frictionally engages said first boss surface so as to inhibit rotation of tube relative to said housing.

17. The power transfer unit of claim 16 wherein an annular space is disposed between said gear and said tube within which a lubricant is disposed, and wherein the frictional engagement between said coupling portion of said seal and said first boss surface inhibits rotation of said tube caused by shear forces transmitted through said lubricant in response to rotation of said gear on said tube.

* * * * *